United States Patent
Ollila et al.

(10) Patent No.: US 8,964,014 B2
(45) Date of Patent: Feb. 24, 2015

(54) POINT-OF-VIEW INTEGRATED VIDEO SYSTEM HAVING TAGGING AND LOOP MODE FEATURES

(75) Inventors: David J. Ollila, Marquette, MI (US); Craig L. Mattson, Marquette, MI (US)

(73) Assignee: V.I.O. Inc., Marquette, MI (US)

( * ) Notice: Subject to any disclaimer, the term of this patent is extended or adjusted under 35 U.S.C. 154(b) by 1711 days.

(21) Appl. No.: 11/971,608

(22) Filed: Jan. 9, 2008

(65) Prior Publication Data
US 2008/0170130 A1 Jul. 17, 2008

Related U.S. Application Data

(60) Provisional application No. 60/879,854, filed on Jan. 10, 2007, provisional application No. 60/889,636, filed on Feb. 13, 2007, provisional application No. 60/890,034, filed on Feb. 15, 2007.

(51) Int. Cl.
*H04N 7/18* (2006.01)
*H04N 5/225* (2006.01)
*H04N 5/232* (2006.01)
*H04N 5/77* (2006.01)
*H04N 5/907* (2006.01)

(52) U.S. Cl.
CPC ......... *H04N 5/2252* (2013.01); *H04N 5/23206* (2013.01); *H04N 5/772* (2013.01); *H04N 5/907* (2013.01)
USPC .......................................................... 348/61

(58) Field of Classification Search
CPC .......... H04N 7/18; H04N 5/232; H04N 5/225
USPC ...................................................... 348/61, 143
See application file for complete search history.

(56) References Cited

U.S. PATENT DOCUMENTS

| | | | |
|---|---|---|---|
| 5,886,739 A | 3/1999 | Winningstad | |
| 6,378,132 B1 * | 4/2002 | Grandin et al. | 725/146 |
| 6,701,061 B2 * | 3/2004 | Karasudani et al. | 386/283 |
| 7,002,621 B2 * | 2/2006 | Adair et al. | 348/158 |
| 7,231,135 B2 * | 6/2007 | Esenyan et al. | 386/241 |
| 7,483,485 B2 * | 1/2009 | Winningstad et al. | 375/240.01 |
| 7,496,140 B2 * | 2/2009 | Winningstad et al. | 375/240.01 |

(Continued)

FOREIGN PATENT DOCUMENTS

DE 102005046719 4/2007

OTHER PUBLICATIONS

Viosport Owner's Manual Viotac.
(Continued)

*Primary Examiner* — Jerry Dennison
(74) *Attorney, Agent, or Firm* — The Dobrusin Law Firm, P.C.

(57) ABSTRACT

The present invention provides a point of view video system comprising: a camera for receiving an image and for generating a video signal; a portable video image recording module including: a display; one or more user activators; a communication interface for signally communicating with the camera that is remote from the recording module; a power source; a speaker; a processing device in signaling communication with the display, the one or more user activators, the speaker, and the communication interface for processing data; and a sealed housing for containing the recording module, the sealed housing being separable from the camera.

20 Claims, 6 Drawing Sheets

(56) References Cited

U.S. PATENT DOCUMENTS

| | | | |
|---|---|---|---|
| 7,525,568 B2* | 4/2009 | Raghunath | 348/61 |
| 7,576,800 B2* | 8/2009 | Swain | 348/376 |
| 7,593,034 B2* | 9/2009 | DeKeyser | 348/143 |
| 2002/0172498 A1* | 11/2002 | Esenyan et al. | 386/69 |
| 2005/0200750 A1* | 9/2005 | Ollila | 348/375 |
| 2006/0055786 A1 | 3/2006 | Ollila | |
| 2006/0170760 A1* | 8/2006 | Anderson et al. | 348/14.04 |
| 2006/0239648 A1* | 10/2006 | Varghese | 386/95 |
| 2007/0189719 A1* | 8/2007 | Furumachi et al. | 386/95 |
| 2008/0170130 A1* | 7/2008 | Ollila et al. | 348/211.99 |
| 2009/0010617 A1* | 1/2009 | Jones et al. | 386/124 |

OTHER PUBLICATIONS

Vio Clip Manager Client Screens.
Vio Video Manager Server Side Design.
Bill of Materials of POV.1 Presented by Integrated Microsystems to Vio Dec. 6, 2008.
POV.1 User Manual.

* cited by examiner

Fig-6

POINT-OF-VIEW INTEGRATED VIDEO SYSTEM HAVING TAGGING AND LOOP MODE FEATURES

CLAIM OF PRIORITY

The present invention claims the benefit of the filing dates of U.S. Provisional Applications Ser. No. 60/879,854 (filed Jan. 10, 2007), 60/889,636 (filed Feb. 13, 2007), and 60/890,034 (filed Feb. 15, 2007), which are hereby incorporated by reference for all purposes

TECHNICAL FIELD

The field of the present invention relates to video capturing devices and more particularly to a portable Point of View video capturing devices adapted to selectively capture, record, and store video streams and optionally display videos therefrom.

BACKGROUND OF THE INVENTION

Advances in recording technology has created a market for point-of-view (POV) cameras, which can be attached to stationary or moveable objects such as helmets, vehicles, guns, headrests, etc. The video recording device captures video and stores images generally in a hands free manner and from the operator's point of view. Typically, the systems are built to withstand exposure to dust, shock, and water under harsh duty conditions. The devices are often also adapted to be mounted to capture images from a vehicle, headgear, a head rest, or any other stationary or movable objects.

Current POV cameras include recording functionality, however, recording under many circumstances such as riding a bicycle, running, jet skiing, skiing, or other rigorous activities, especially, with one user recording video may cause difficulties in recording, provide unsafe recording environments, or both. It would be attractive to provide an improved POV camera device that has a wide range of versatility.

SUMMARY OF THE INVENTION

In one aspect, the present invention is directed to a point of view video system comprising: a camera for receiving an image and for generating a video signal; a portable video image recording module including: a display; one or more activators; a communication interface for signally communicating with a camera that is remote from the recording module; a power source; a speaker; a processing device in signaling communication with the display, the one or more user activator, the speaker, and the communication interface for processing data; and a sealed housing for containing the recording module, the sealed housing being separable from the camera.

In another aspect of the present invention, it is contemplated that the POV video system has one or any combination of the following features: it further comprises a cable connecting the camera to the recording module, a microphone, a light, a remote control having a first and second activator, one or more I/O ports for communication with one or more external devices, an electronic storage medium, or any combination thereof; the sealed housing is separated from the camera; the signally communicating of the communication interface is achieved through a wireless communication such as radiofrequency, IR, or both; the remote control is wireless such that the remote control is not tethered to the recording module; the one or more user activators being located between the display and a speaker grille; the first activator of the remote control configured for recording a video, "tagging" a video, or both and the second activator configured for stopping recording; the sealed housing is a generally elongated housing; the sealed housing includes a generally common forward surface with which the display and the one or more user activators may be generally coextensive; the generally common surface is substantially coplanar; the sealed housing includes a curved rearward surface; the recording module is free of a QWERT keyboard; the recording module is free of a image sensor; the power source is isolated thermally, electrically, or both from the processing device (e.g., by a printed circuit board); the sealed housing includes a removable cover that allows access to one or more I/O ports, the storage medium, the power source, or any combination thereof; the removable cover is configured to nest in the sealed housing; the removable cover includes a locking mechanism for attaching to the sealed housing; the locking mechanism is a screw; the removable cover is located at an end of the sealed housing; the one or more ports may be located in a compartment, at an end of the sealed housing, or both; the removable cover is configured to be generally flush with the sealed housing on its outer surface; the one end of the sealed housing includes a recess configured for receiving a portion of the compartment; or any combination thereof.

By way of one specific example, the present invention provides a point of view video system comprising: a camera for receiving an image and for generating a video signal; a remote control having a first user activator for recording a video, "tagging" a video, or both and a second user activator for stopping recording; a portable video image recording module including: a) a display; b) one or more user activators; c) a communication interface for signally communicating with a camera that is remote from the recording module; d) a power source; e) a speaker; f) an electronic storage medium; g) a processing device in signaling communication with the display, the remote control, the one or more user activators, the speaker, and the communication interface for processing data being isolated thermally and electrically from the processing device; h) one or more I/O ports for communication with one or more external devices; a generally elongated sealed housing for containing the recording module, the sealed housing being separate from the camera; the sealed housing including a generally common forward surface with which the display device and the one or more user activator may be generally coextensive, and a curved rearward surface; and wherein the sealed housing includes a removable cover located at an end of the sealed housing that allows access to one or more I/O ports, the storage medium, the power source, or any combination thereof, the removable cover includes a locking mechanism for attaching to the sealed housing; a microphone, a light, or both; and a cable connecting the sealed housing to the camera. The one or more user activators are located between the display and a speaker grille.

DETAILED DESCRIPTION OF THE INVENTION

With respect to a particular embodiment as shown in FIGS. 1-5, the present invention provides a point of view (POV) video system 10. The system includes a camera 12 for receiving an image and for generating a video signal. A remote control 14 having a first user activator 16 for recording a video, "tagging" a video, or both and a second user activator 18 for stopping recording are also provided. The system preferably includes a portable video image recording module 20, a storage medium 32, and a generally elongated sealed housing 36 for containing the recording module 20, the sealed housing being separate from the camera 12. It is contemplated that the recording module may include a display 22 for playback of recorded video, one or more user activators 24; a communication interface 26 for signally communicating with the camera 12 that is remote from the recording module 20; a power source 28; a speaker (not shown); a processing device (not shown); one or more I/O ports 34 for communication with one or more external devices, or any combination thereof.

It is further contemplated that the sealed housing may include a generally common forward surface 38 with which the display 22 (e.g., the one or more user activators 24 being generally coextensive), and a rearward surface 40 (e.g., a curved rearward surface). The sealed housing may include a removable cover 42 located at an end 44 of the sealed housing that allows access to one or more I/O ports 34, the storage medium 32, the power source 28, or any combination thereof. It is yet further contemplated that the removable cover 42 may include a locking mechanism 46 for attaching to the sealed housing 36. The processing device may be in signaling communication with the display 22, the remote control 14, the one or more user activators 24, the speaker, the storage medium 32, and the communication interface 26 for processing data. Such features may be isolated thermally, electrically, or both from the power source (expect by a power connection) such as by one or more walls 76, an insulation material, or both with the one or more user activators may be located between the display and a speaker grille 54. The intermediate wall may be configured for isolating thermally, electrically, or both the power source from the processing device, reinforcing the sealed housing, or both. Optionally, it is appreciated that the POV video system may further include a microphone 48, a light 50, or both. A cable 60 for signaling communication may connect the sealed housing 36 to the camera 12. However, it is possible the contents of the sealed housing 36 may be in signaling communication with the camera 12 by a wireless connection (e.g., radio frequency, IR, or otherwise).

In more particular detail, the camera 12 that may include one or more of the following components: a lens, a lens cover, a neutral density filter, a sensor (e.g., a charge-coupled device (CCD), a CMOS sensor, or otherwise), a global shutter, a housing, the like, or otherwise. As seen in one aspect, the camera further includes a means for transmitting a video signal such as a cable (e.g., Audio/Video (A/V) cable), a radio frequency transmitter, an infrared red (IR) transmitter, any combination thereof, or otherwise. For example, in one embodiment, the means for transmitting a video signal may be a cable connecting the camera to the recording module, the camera being separated from the recording module of the sealed housing. The cable may also provide power from the power source of the recording and playback module to the camera, though not required (e.g., if a battery unit is separately employed). Where the means for transmitting a video signal is through radio frequency, IR, the like or otherwise, the camera may also include an integrated power source (e.g., standard batteries, rechargeable batteries, solar power, the like or otherwise), though not required. Additionally the camera may include an integrated storage medium (e.g., slot for receiving removable storage, or otherwise), though not required, for storing video captured by the camera. In one embodiment, the camera may include an elongated profile, preferably cylindrical, though other shapes are contemplated such as a rectangular, a square, or otherwise. By way of example, as seen in FIG. 1A, a first end 130 includes the lens 132. Though not required, the lens may be recessed from the outer edge 134 thereby forming a peripheral flange 136 within the first end. A second end 138 may include an attached means for transmitting the video signal 26, as seen in FIG. 1B. The camera may further include one or more of the following features: auto focus, manual focus, a sealed structure, the like or otherwise, and any combination thereof. Preferably, the camera is free of a display.

In another embodiment, the camera may include a color charge-coupled device (CCD) sensor not shown (e.g., ¼ inch, ⅓ inch, or otherwise from Panasonic, Sony, or otherwise). The CCD sensor converts the light pattern that is captured by the camera into electrical signals. A signal processor and printed circuit board (not shown) convert the signal from the CCD sensor into a signal compatible with the recording module via software written to produce the desired signal format. Several embodiments of the camera are commercially available under the designation ADVENTURE CAM 3, ADVENTURE CAM H2O, S.C.O.U.T. CAM, AND ADVENTURE CAM II, each sold by Viosport.com, Inc. (Marquette, Mich., USA).

The present invention may further include a remote control employing one or more activators (e.g., buttons, switches, transducers, devices that respond to a voice comment, the like or otherwise, or any combination thereof). For example, one remote control may employ a first activator and a second activator. The remote control may be an encapsulated unit including a first surface that exposes a contact surface for the first and second activators. Optionally the remote control may include a second surface or a structure for mounting the remote control to an object, e.g., a clip, a clamp, or otherwise. Preferably, the first activator, the second activator, or both of the remote control share a generally common surface (e.g., a substantially planar upper surface). In one embodiment, the first activator may be configured for recording a video, "tagging" a video (as discussed herein), or both, while the second activator may be configured for stopping recording. It is contemplated that the remote control may be wireless such that the remote control is not tethered to the recording module, though not required. When included, the wireless remote may be configured to communicate with the recording module through radio frequency, IR, or both, include an integrated power source, the like or otherwise, and any combination thereof. It is appreciated that activation of the first activator, the second activator, or both initiates communication with the recording module, more specifically the processing device therein for controlling the one or more functions of the POV video system that correspond to the respective activator. It is further contemplated that the remote control may include additional activators or fewer activators.

The present invention may further include a portable video image recording module for recording video. More specifically, the recording module is configured for recording live motion video that may include images, video streams, audio streams, or any combination thereof. It is appreciated that the recording module may include several "Settings" options in recording video to optimize video recording, video replay, video viewing, video storage, the like or otherwise, and any combination thereof. For example, it is contemplated that the user may want to adjust the 1) Frame Rate, which defines the number of frames that may be recorded per second (e.g., 30, 25, 24, 15, or otherwise) and affects how smooth the playback will be, 2) Video Resolution, which defines the number of pixels recorded in each frame (e.g., 720×480, 720×400, 640× 480, 360×240, 360×200, 320×240, or otherwise), 3) Video Quality, which affects the amount of compression used (e.g., High, Medium, and Low Compression) when storing the video; a high setting produces a sharper more accurate image, but takes more space on the storage medium and a low setting saves space but sacrifices color accuracy and detail, 4) the like or otherwise, or any combination thereof. It is further contemplated that the recording module can record in High Definition (HD) having a video resolution greater than 720×480 (e.g., 1024×768, 1280×720, 1024×1080), include interlaced scanning, progressive scanning, or otherwise, or both.

The recording module may further include a display for playback of the recorded video. The display device may be adapted to display information provided by a signal (e.g., video signal from the camera, stored in a storage medium, the like, or otherwise) to be viewed by a user. In one aspect, the display device (e.g., including a substantially flat display screen) may communicate with the processing device through a video adapter, graphic adapter, video card, graphic card or by other known means in the industry, which converts the video signal to viewable information displayed to the user. The display device may display full color images, though not required. The display device may include a length, width, radius, or otherwise such as to form a display shape that may be square, rectangular oval, circular, triangular, polygonal, or otherwise). The display device may be a Liquid Crystal Display, a plasma display, the like or otherwise. The display may be generally flush with the sealed housing forward surface, has a size of at least about 0.5 cm display size (e.g., diagonally), or any combination thereof. In another aspect, the display device may also be configured to include one or more activators (e.g., pressure points) to activate functions of the POV video system. Optionally, the recording module may be free of a QWERT keyboard, free of an image sensor, or both. It is further contemplated that the POV video system may include one or more remote displays, such that the display may be located remotely from the sealed housing, the display may be separable (e.g., detachable) from the sealed housing, or any combination thereof. For example, in one embodiment, it is appreciated that either or both of the remote control of the POV video system may further include a display.

In one embodiment, the display device may be configured to provide display information about one or more features of the POV video system. Examples of the display information as shown in FIGS. 5A-5B include, but are not limited to one or more of the following: Mode Status 112 (e.g., "Record," "Standby," "Video Select," or "Playback"), the Record Mode 114 (e.g., "Clip" or "Loop"), the Play Mode ID 116 (e.g., clip number/total number of clips on the storage medium), the Time Status (e.g., elapsed record time in (Record Mode), estimated available record time remaining 118 in (Standby Mode), length of clip in (Video Select), or elapsed time of clip 120 in (Playback)), the Power Status 122 (e.g., alert for low power condition), the Soft Key Function 124 (e.g., "KEY-LOCK" (e.g., prevents activation of the user activators), "PREV" (Previous), "DEL" (Delete), "NXT" (Next)), the Error/Warning Message (e.g., SD card error, Low Power, Missing Camera Head), USB Mode (e.g., POV is connected to an external device via USB connection) the like, or otherwise.

The recording module may further include one or more user activators (e.g., buttons, switches, transducers, devices responding to a voice comment, the like or otherwise, and any combination thereof) that may be configured to enable the user (e.g., operator) to access the functions of the POV video system, as discussed herein. Examples of functions performed upon activating the user activators may include, but are not limited to: Start playback of the video; Stop playback of the video; Start recording video; Stop recording of the video; "tagging" the video; Access Setting options; Access one or more Soft Key functions; or any combination thereof. It is appreciated that the Soft Key functions may change depending on the current mode of the POV video system. The Soft Keys may be located adjacent to the display device. The current function of each Soft Key may be displayed in display device, adjacent to the respective Soft Key. In another aspect, the one or more user activators may be located on the remote control, the sealed housing of the recording module, the camera, otherwise, or any combination thereof.

By way of one specific example, the POV video system may include a PLAY/STOP activator. In the Play Mode, when the PLAY/STOP activator is activated (e.g., by the user) the currently selected video begins playback. If a video is currently playing, activating the PLAY/STOP activator stops playback. In another aspect, the POV video system may include a RECORD activator. In the Record Mode, once the RECORD activator is activated (e.g., by the user), recording of video begins. If a video is currently being recorded, activating the RECORD activator stops recording and places the POV video system in Standby Mode.

It is further appreciated the Setting options of the user activators may include setting various options of the display. Examples of the "Setting" options may include, but are not limited to, the options or values provided in Table 1.

TABLE 1

| | |
|---|---|
| Enable Remote | Yes or No |
| Remote I.D. | 0-9, (Matching Remote Control I.D. Setting) |
| Speaker Volume | 0-9 |
| Microphone Level | 0-9 |
| Time and Date | hh:mm & mm/dd/yyyy |
| Frame Rate | 30, 25, 24, 15, (frames per second) |
| Video Resolution | 720 × 480, 720 × 400, 640 × 480, 360 × 240, 360 × 200, 320 × 240 |
| Video Quality | High, Medium, Low |
| Record Mode | Clip, Loop, Still |
| Loop Record Time | 20, 30 sec., 1, 2, 3, 5, 10, 15, 30 min. |
| LCD Sleep Timeout | Never, after 15 sec., 1, 2, 3, 5, 10, 15, 30 min. |
| Power Off Timeout | 20 sec., 1, 2, 3, 5, 10, 15, 30 min. |
| Display Brightness | 1-10 |
| Format Storage Medium | Yes or No. (Warning: formatting erases all data) |
| Video Output | NTSC, PAL |
| POV Information | HW: Hardware Version |
| | FW: Firmware Version |
| | MAIN: Hardware ID |
| | HEAD: Camera ID |

It is contemplated that the user activators may be located anywhere about the POV video system that is accessible by the user (e.g., forward surface, rearward surface, or otherwise, and any combination thereof). In one aspect, the user activators may be located on the recording module, the remote control, or otherwise, and any combination thereof.

The recording module may further include a communication interface for signally communicating with the camera. Preferably, the camera is remote from the recording module, though not required. In one embodiment, as discussed, the signaling communication with the camera may be achieved through a cable, which tethers the camera to the sealed housing of the recording module. In one aspect, the cable assembly may also include a line for providing power to the camera from the power source of the recording module. Optionally or as an alternative, the signaling communication may be achieved through a radio frequency, IR, the like or otherwise, and any combination thereof. Examples of signal communications may include, but are not limited to WiFi, Bluetooth®, the like, or otherwise.

The power source for supplying power to one or more components of the POV video system may include one or more of a variety of devices and accessories. For example, the power source may utilize standard batteries (e.g., AAA or AA batteries), a rechargeable battery, solar power, or any combination thereof. In one embodiment, it is appreciated that an external power source may be utilized for supplying power to the POV video system and may be supplied through the input/output ports as discussed herein. Optionally or as an alternative, the power source may further include a cigarette lighter power cord; an internal battery holder within the recording module, a charging unit, a power cord (e.g., AC or DC), the like or otherwise, and any combination thereof. In one embodiment, it is further contemplated that the one or more components of the POV video system may be powered by a USB cable when the unit is connected to an external device such as a computer, a wireless power transfer (e.g. radio frequency, IR, the like or otherwise, and any combination thereof), or both.

Figure 1:
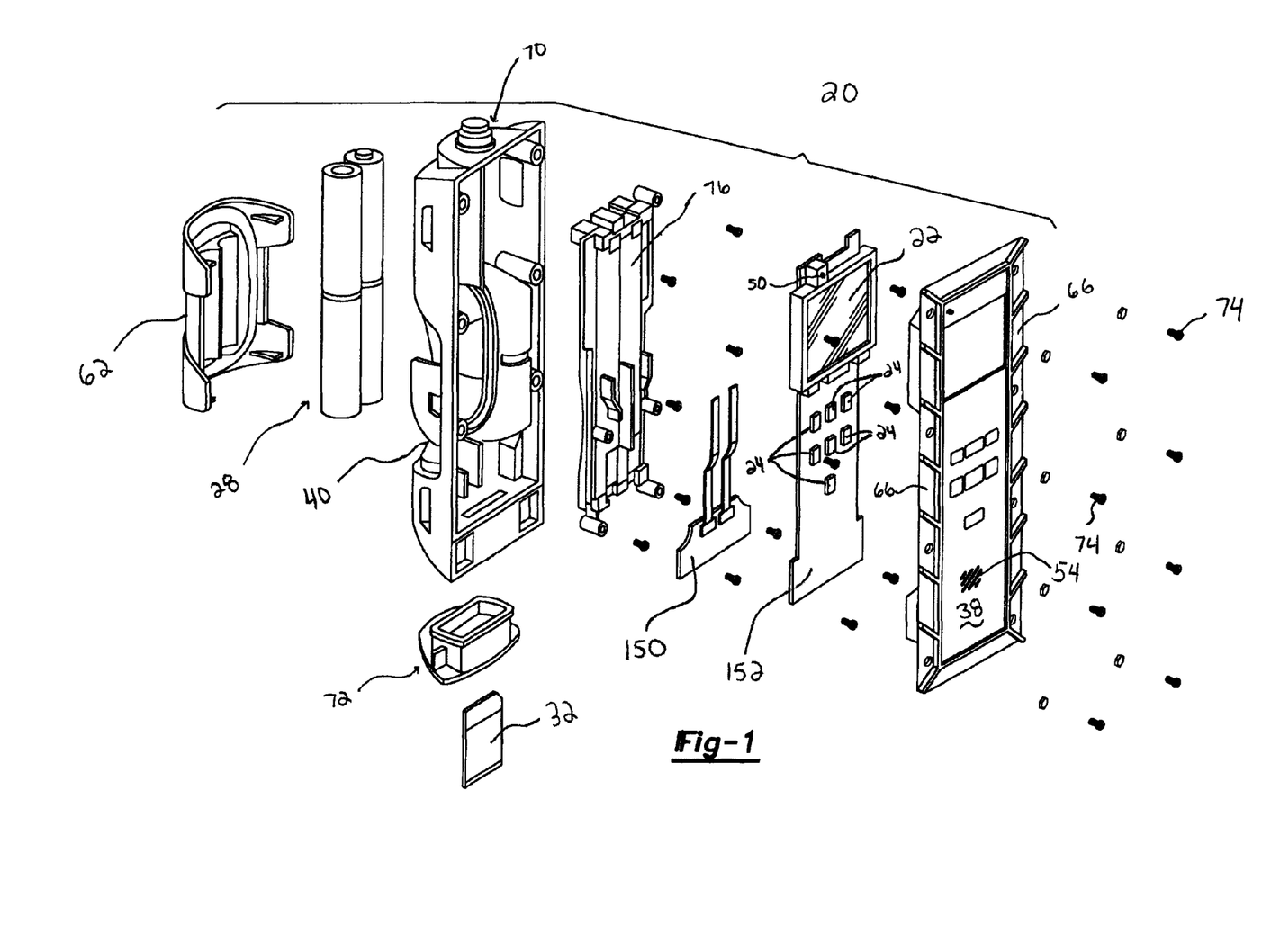
FIG. 1 illustrates an exploded view of one aspect of the present invention.
Figure 1A:
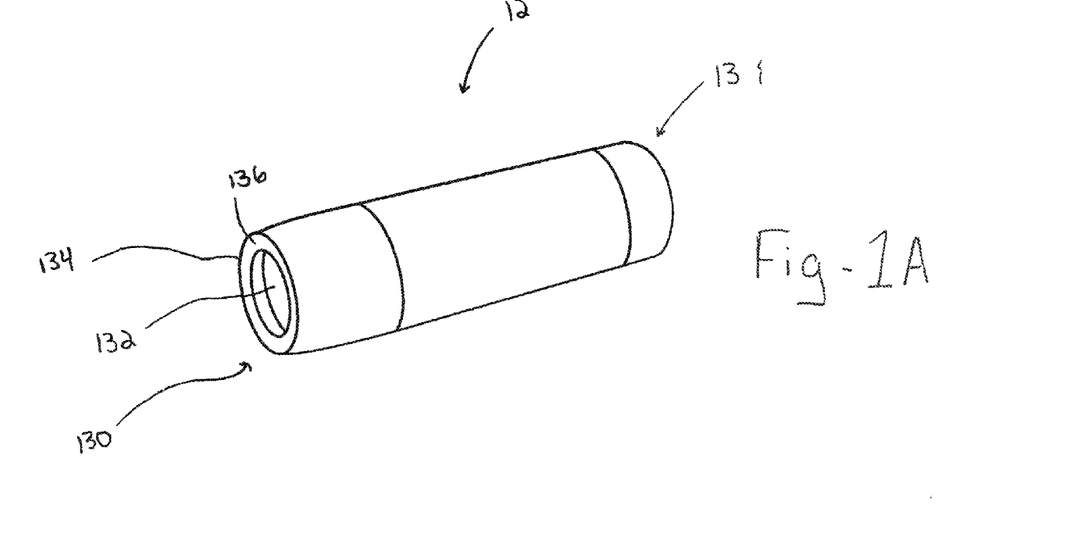
FIG. 1A illustrates a perspective view of one aspect of the present invention
Figure 1B:
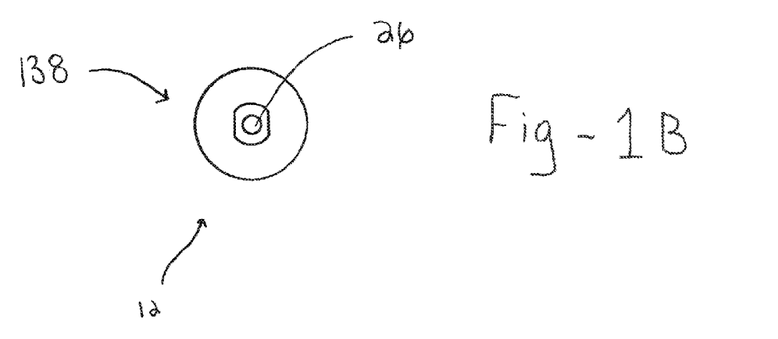
FIG. 1B illustrates a perspective end view of one aspect of the present invention
Figure 2:
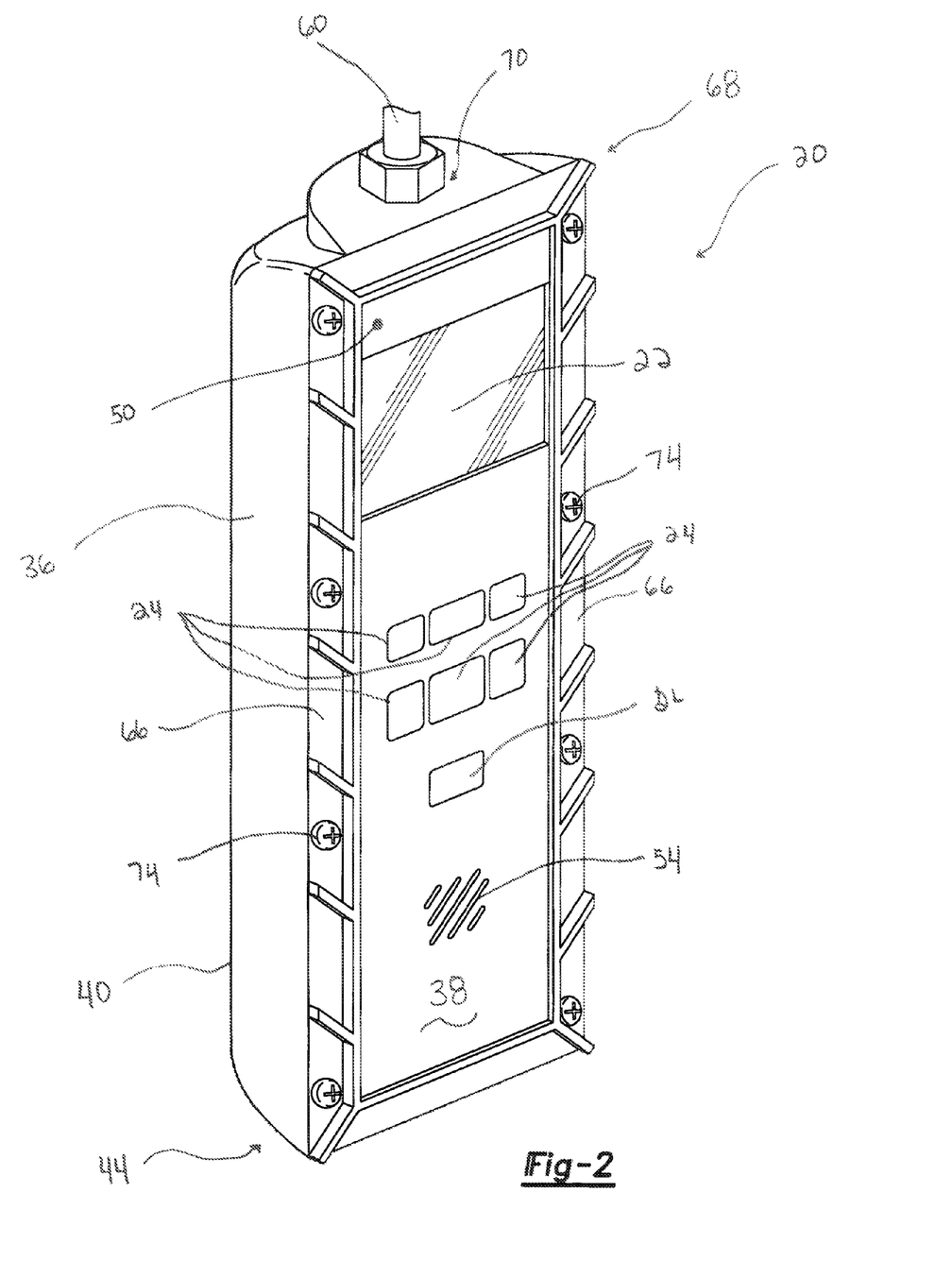
FIG. 2 illustrates a perspective view of one aspect of the present invention.
Figure 3:
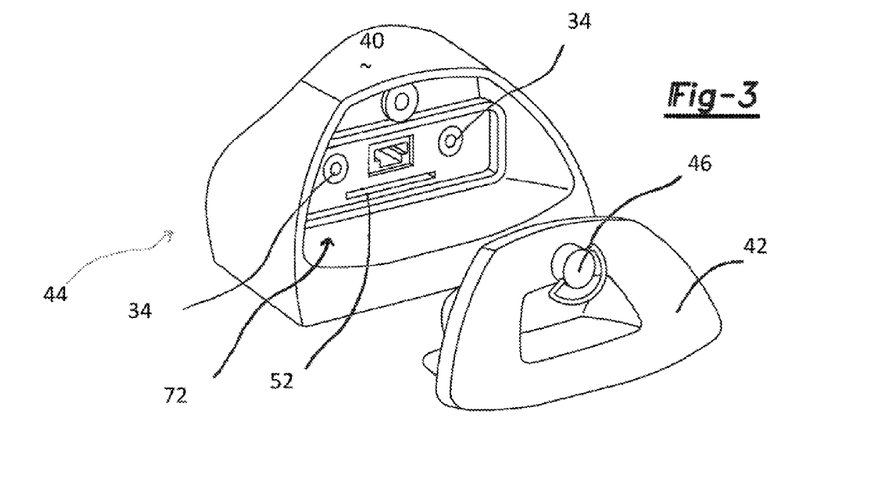
FIG. 3 illustrates a perspective end view of one aspect of the present invention.
Figure 4:
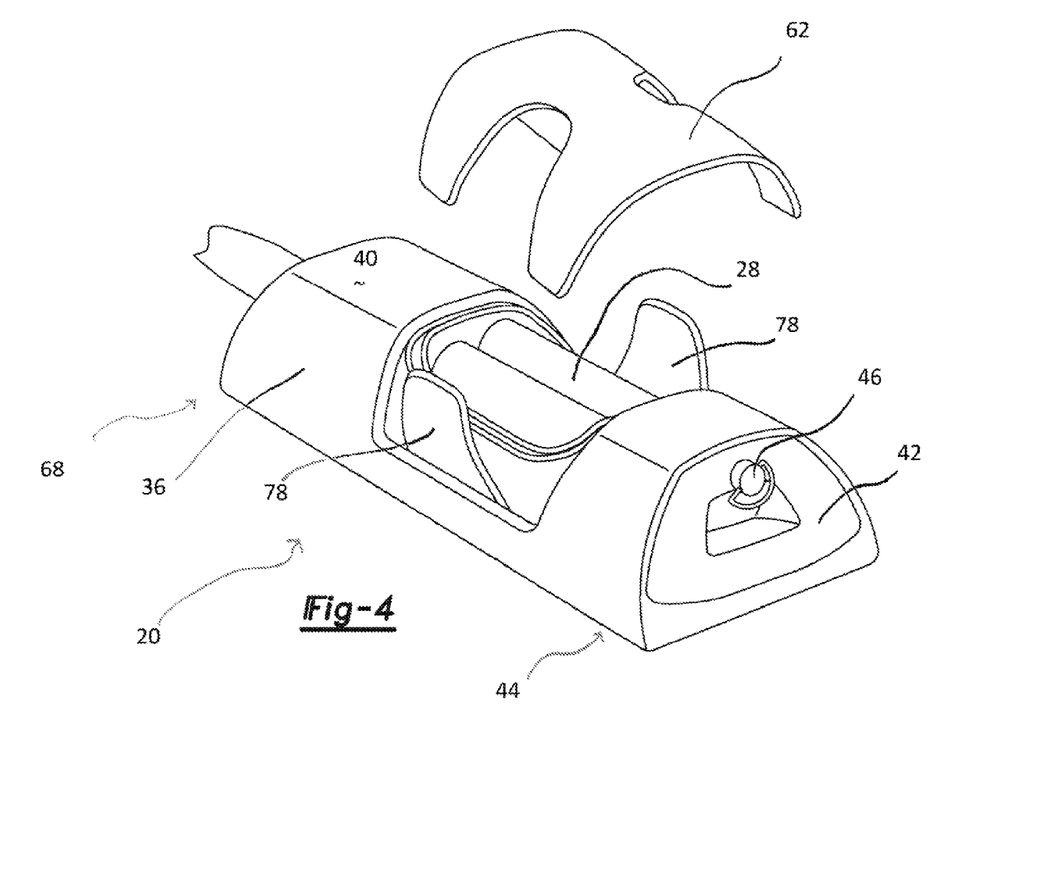
FIG. 4 illustrates a perspective rearward view of one aspect of the present invention.
Figure 5:
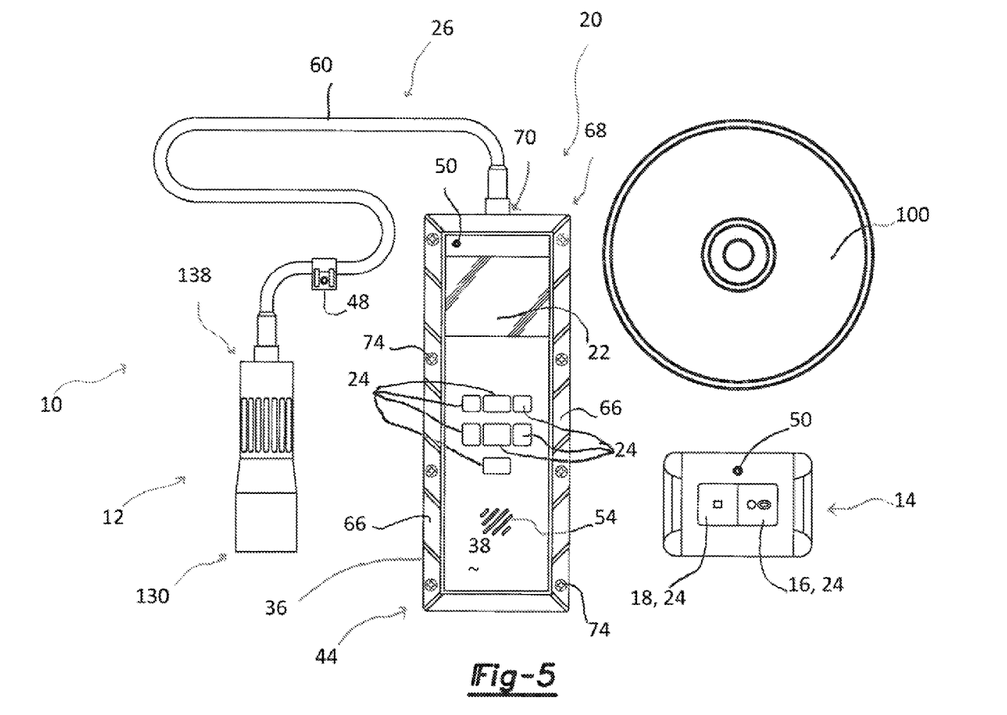
FIG. 5 illustrates a plan view of one aspect of the present invention.
Figure 5A:
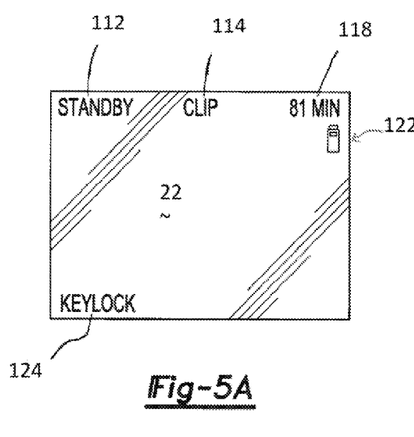
FIGS. 5A-5B illustrate another plan view of several aspects of the present invention.
Figure 5B:
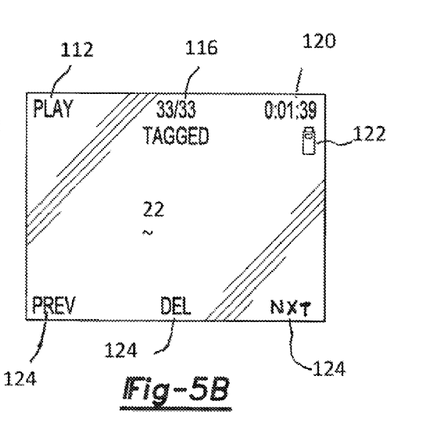

As discussed, the recording module may further include a speaker (not shown) approximate to a speaker grille that may be generally located about the forward surface of the sealed housing (FIGS. 1, 2, and 5). The speaker may be adapted to playback information provided by a signal (e.g., audio signal from the microphone that may be included in the recording module, the cable, or otherwise, stored in the storage medium, the like, or otherwise) to be listened to by the user. Preferably, the audio signal corresponds to an image signal provided by a video, though not required. As such it is contemplated that speaker may be configured to playback audio (e.g., MP3, WAV, the like or otherwise) regardless of an image signal, a video signal, or both. In one embodiment, the one or more user activators may be located between the display and the speaker grille.

The recording module may further include a processing device in signaling communication with one or more of the display, the one or more user activators, the speaker, the communication interface, or otherwise for processing data. The processing device may be included on a main circuit board 152 (FIG. 1) for signaling communication with the one or more components of the POV video system. The main circuit board 152 may further include the display, the one or more user activators, the speaker, or otherwise, or any combination thereof for signaling communication with the processing device or otherwise. It is contemplated that the processing device may include one or more separate processors, one or more integrated processors having several combined processors, or both. In one embodiment, the processing device may include a processor such as a COACH 8 processor that is commercially available from Zoran Corporation, for digital signal processing. In one aspect, the processing device may be configured for controlling the one or more components of the POV video system upon the activation of the one or more activators of the remote control, the recording module, or otherwise. Preferably, the processing device is isolated thermally, electrically, or both from the power source other than through a predetermined electrical path for delivering the power (e.g., a wire, a bus bar, or otherwise).

The recording module may further include one or more I/O ports for communication with one or more external devices. Examples of I/O ports may include, but are not limited to A/V ports, removable storage drives, universal serial bus (USB), firewire, power inputs, or any combination thereof. In one embodiment, one or more of the I/O ports may be housed on an internal circuit board 150 (FIG. 1). The circuit board 150 may be in communication with the main circuit board 152 (e.g., the processing device), attached thereto, or both. The circuit board 150 may be located within the sealed housing between the forward and rearward surfaces and fixedly secured to either or both surfaces, the main board 152, the intermediate wall 76, or any combination thereof. Examples of external devices may include, but are not limited to computers, camcorders, DVD players, VCR players, recorders (e.g., CD or DVD burners, or digital video recorders (DVR)), televisions, portable media devices, or any combination thereof.

Additionally, it is contemplated that the present invention may also be configured to interface with external devices (e.g., through the internet/network ports, or otherwise) as discussed herein. As such, it is appreciated that the POV video system may further include at least one networking component such as a modem, a local area network (LAN) card, a wireless adapter, (e.g., radio frequency such as WiFi, BLUETOOTH® technology, IR, the like or otherwise, and any combination thereof), a cable modem, a digital subscriber line (DSL), very high bit-rate DSL (VDSL) modem, or any combination thereof, or otherwise.

It is further contemplated that the present invention may include one or more display ports such as analog connectors, digital visual interface (DVI), HDMI, or otherwise for connecting a removable, (external), display to the POV video system. It is also appreciated that components of the POV video device may be in communication with the POV video system wirelessly through a radio frequency, IR, or both, as discussed herein.

Turning again to additional details about the housing, desirably, the housing is a sealed housing of a sufficiently robust design that can withstand rugged environmental conditions (e.g., storage temperature range of about −20 to about +85° C., Operating temperature range of about −10 to about 65° C., or otherwise). In one embodiment, the sealed housing may be a generally elongated unit having a depth, width, and length (e.g., 40 mm×60 mm×167 mm). Preferably the length is at least about 1.5 times the width, though possibly lower, more preferably the length is at least about 2 times the width. In one aspect, the sealed housing may include a generally common (e.g., coplanar) forward surface. In another embodiment, the display device and the user activators may be generally coextensive with the generally common forward surface. In another aspect, the sealed housing may include rearward surface (e.g., a curved rearward surface). It is contemplated that the forward, surface, or the rearward surface may be similar or different. It is further contemplated that at least one surface of the sealed housing include a generally common surface, arcuate surface, or combination thereof. It is further contemplated that the design and operation of the recording module and the sealed housing are such that the user may transport the recording module while operating it, either or both by using a single hand (e.g., carrying the recording module in one hand while operating it with the same hand).

In another embodiment, the rearward surface may include a rearward cover 62 (FIG. 4) that may be hinged, removable, or otherwise to provide access to the power source, or otherwise. In one aspect, the sealed housing 36 may further include a locking mechanism 78 for attaching to the rearward cover 62. Examples of locking mechanisms include, but are not limited to screws, latches, cam locks, snap fits, or any combination thereof. Preferably the rearward cover is nested in the rearward surface thereby providing a sealed enclosure 64 that may house the power source, or otherwise. In another aspect the sealed housing may include a bezel 66, adjacent to the generally common forward surface 38, or some other structure that surrounds and frames the periphery of the forward surface. The bezel may be part of the forward surface 38, the rearward surface 40, a separate piece, or any combination thereof. It is appreciated that the bezel provides an aesthetic design, structural reinforcement, rigidly, enclosure of the sealed housing, or any combination thereof. Examples of the bezel securement means may include, but are not limited to screws 74, adhesives, welding, the like or otherwise, and any combination thereof. By way of example, the screw 74 (FIG. 1) may provide securement means and may extend from the forward surface to the rearward surface, may extend from the forward surface to one or more intermediate structures within the sealed housing.

In another embodiment, the sealed housing may further include a first end 68 having an A/V port 70 to provide the signaling communication 26 with the camera, when a cable 60 connection is contemplated. In yet another embodiment, the sealed housing may further include a second end 44 having a cover 42 (FIG. 3) that may be removable, hinged, or any combination thereof. In one aspect, the cover 42 may allow access to one or more of the I/O ports 34, the storage medium 32, a removable storage port 52 (e.g., a memory card reader) configured for receiving and accessing data from a removable storage medium, the power source 28, or otherwise, and any combination thereof. In another aspect, the cover 42 may be configured to nest in the sealed housing 36. In another aspect, the cover 42 includes a locking mechanism 46 for attaching to the sealed housing 36. Optionally, the cover is hingedly connected to the sealed housing. Examples of locking mechanisms include, but are not limited to screws, latches, cam locks, snap fits, or any combination thereof. In another aspect, the cover 42 may be configured to be generally flush with the sealed housing 36 on its outer surface 40. Preferably, the cover 42 encloses a compartment 72 located about the end 44 of the sealed housing 36. In one aspect, the end 44 of the sealed housing includes a recess configured for receiving a portion of the compartment 72.

The present invention may further include one or more electronic storage mediums having at least 2 GB (e.g., 8 GB, 16 GB, 80 GB, or more) of storage though possibly less for storing images (e.g., pictures), video (e.g., WMV, AVI, MPEG, MOV, MPED-4), audio (e.g., MP3, WAV, WMA), documents, programs, the like or otherwise, and any combination thereof. It is contemplated that the storage medium may be located within the camera, the recording module, or otherwise. In one aspect, the storage medium may include removable storage such as media cards (e.g., CompactFlash, Memory Stick (e.g., Pro, Duo, MagicGate), MultiMediaCard (e.g., Reduced Size, Mobile), Secure Digital Card (e.g., mini, micro), SmartMedia, xD-Picture Card, wireless memory card (e.g., Eye-Fi) that transmits data stored on the memory card to another (e.g., external) device wirelessly (e.g., radio frequency, IR, or otherwise), the like, or otherwise), storage discs (e.g., CD, DVD, HDDVD, Blue Ray, Floppy Disc). Optionally or as an alternative, the storage medium may include a large-capacity permanent storage (e.g. hard disk drive, the like, or otherwise).

In one aspect, it is contemplated that the present invention may include one or more types of system memory such as random-access memory (RAM) having at least about 64 MB (e.g., 256 MB), or possibly less, used to temporarily store information that the processing device is currently working with, read-only memory (ROM), a permanent type of memory storage used by the processing device for important data that does not change (e.g., NAND Flash). In one aspect, the storage medium may be adapted for caching (e.g., storing), frequently used data in extremely fast RAM that connects directly to the processing device, (when incorporated in the POV video system), which allows the processing device to access the data in faster application than if the data was stored elsewhere, such as in storage medium, which is discussed herein.

It is further contemplated that the present invention may include a basic input/output system (BIOS), firmware, extensible firmware interface (e.g., EFI or UEFI), the like or otherwise, and combinations thereof, which is a specific type of program that may be used by the processing device to establish basic communication to the components of the POV video system when the device is being utilized.

Optionally or as an alternative, the present invention may further include an audio component (e.g., microphone), a light, or both. In one embodiment, the microphone may be configured for receiving an audio stream and for generating an audio signal. In one aspect, the POV video system may include a built in microphone, when included the built in microphone may be integrated with the camera, the recording module, the cable, the remote control, or otherwise. Preferably, the built in microphone may be located about the cable, (when included), which connects the camera to the recording module. In another embodiment, the POV video system may include an I/O port for connection of an external microphone. In yet another embodiment, the microphone may be in signaling communication with the recording module through radio frequency, IR, the like or otherwise, and any combination thereof.

In one embodiment, the light may be configured to provide enlightened brighter environment when operating the POV video system. Examples of a light include, but are not limited to LEDs, light bulbs, halogen lights, the like, or otherwise. In another embodiment, the light (e.g., indicator light) may be configured to provide information regarding the status of the system. Examples of indicator lighting includes, but is not limited to "dark" or no light, which represents that the system is turned off, an orange indicator light, which represents that the system is "booting up," a green indicator light, which represents that the system is in "Standby Mode," a flashing red indicator light, which represents that the system is recording in "Record Mode," and a flashing orange indicator light, which represents a "warning/alert condition" for the system. Though not required, the POV video system may include additional indicator interfaces, less indicator interfaces, different indicator interfaces (e.g., indicator having a different representation or representation having a different indicator, no indicator interfaces or different types of indicator interfaces (e.g., audio indicators).

The present invention may further include one or more mount assemblies to assist in mounting one or more components of the POV video system to each other, to the user, to an object, the like, or otherwise. The mount assemblies may include one or more securement aspects such as fasteners having clamps, clips, adhesives, hook and loop fasteners, zip ties, vacuum suction, screw mounts, the like or otherwise, and any combination thereof. Different mount assemblies provide different attachment for different components of the POV video system. For example, different mount assemblies for the camera provide versatile alignment for different video shots by the camera. By way of example, in one embodiment, a first potion (e.g., top portion) of the mount assembly may be secured to the camera and another portion (e.g., bottom portion) of the mount assembly may be secured (e.g., detachably) to some structure (if it is not hand held), another surface (e.g., helmet, bicycle, motorcycle, snowmobile, jet ski, firearms, the like, or otherwise), or otherwise. In one preferred embodiment, the camera system is submersible in liquid and may even possess an IP67 rating (e.g., it is submersible in water at about 1 meter for about 30 minutes without deteriorating its function).

In one preferred embodiment of the present invention, the POV video system may include a camera, a recording module, and a sealed housing containing the recording module. The recording module may include a display screen which can replay captured video using the user activators. The recording module may further include firmware, which enables the module to record video captured by the camera and audio captured by the microphone. Once video is captured, the video may be selectively stored internally on a removable media SD memory card. The integrated POV video system may further includes a wireless remote. The wireless remote includes recording and "tagging" activators, which are in communication with the processing device of the recording module for accessing the functions of the POV video system.

In another preferred embodiment, the present invention may be further configured to transform the process of POV video into a seamless flow from video capture to cut-and-splice editing to online distribution. This process may be handled by firmware in the recording module and software installed on an external media device such as a computer (e.g., PC or Mac) from included software package 100 (FIG. 5). After initial setup, users will be able to capture video with the POV video unit, review their work on its color LCD, and securely share the video online through the internet with other people via their personal computers.

The present invention may further provide various methods for recording video. One recording method includes a "Clip Mode," which works like a traditional video camera, for example, when you activate the Record activator, video is recorded continuously until the storage medium is full or until the user stops recording. Another recording method includes a "Loop Mode," which allows the user to selectively save individual video clips of a pre-set length thereby minimizing utilized storage space on the storage medium.

In one embodiment, the "Clip Mode" may allow the user to continuously record and store video until the storage medium is full or until the user stops recording, while "tagging" important recorded instances throughout the recording process. "Tagging" creates a data file (e.g., Metafile such as WMF, EMF, CGM, THM, or otherwise) that may include information, which describes, specifies, instructs, or otherwise another file (e.g., a video or audio file such as WMV, AVI, MPEG, MOV, WMA, MP3, MP4, WOV, or otherwise). Examples of information that may be contained in a data file include, but are not limited to a "tagged" video identifier, a time identifier, the like or otherwise, and any combination thereof. For example, the data file may include information about the corresponding "tagged" video file such as a "tagged" video identifier, which that identifies a video file (e.g., stored on the storage medium of the POV video system, of an external device, or both) that corresponds to the data file. The data file may also include a time identifier, which identifies a duration of recorded video proximate to the time of the "tagging" activation (e.g., a time interval between one or more known points in the video file such as from the start of the video file to the "tagging" activation, from a first "tagging" activation to a second "tagging" activation, from a "tagging" activation to the end of the video file, or otherwise, and any combination thereof).

Figure 6:
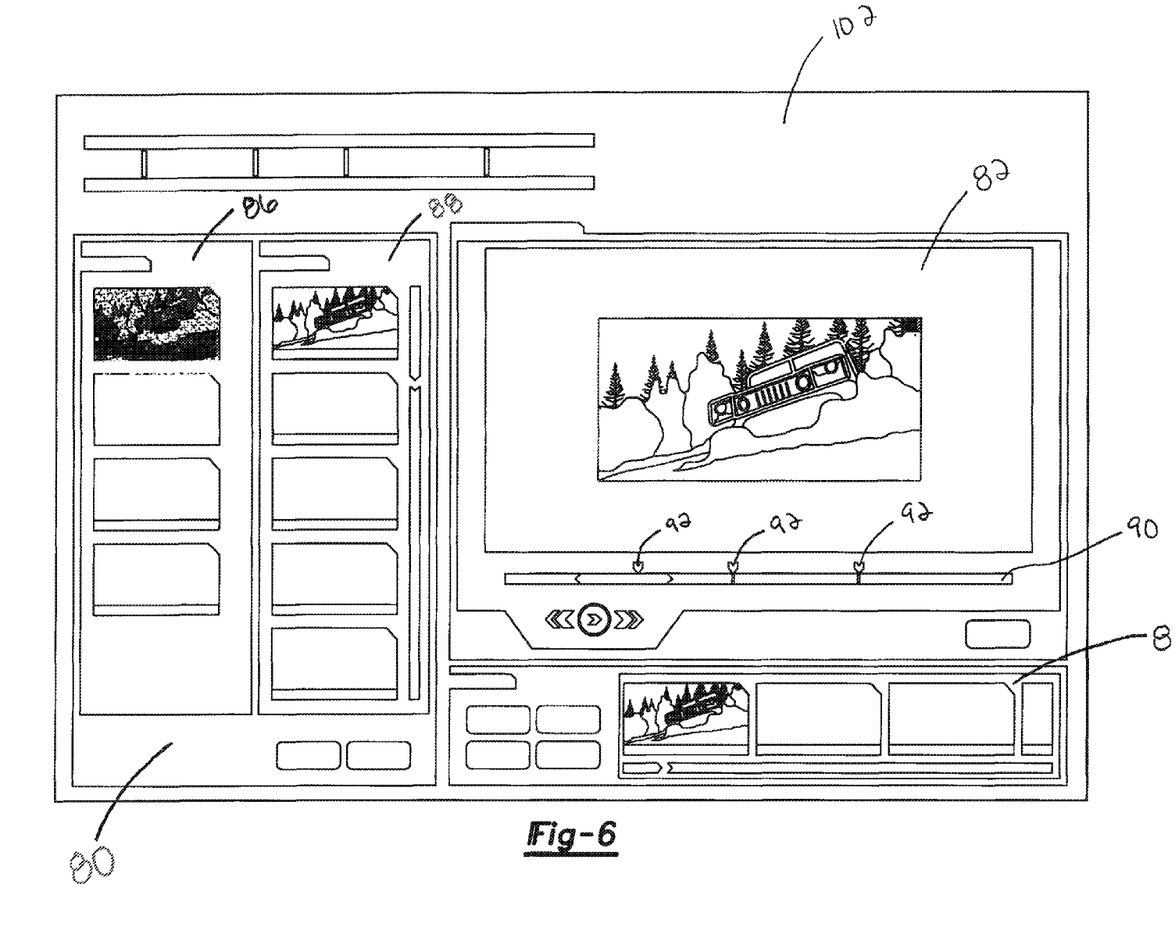
FIG. 6 illustrates another aspect of the present invention.

By way of one specific example, once a "tagging" activation has created a data file that corresponds to a "tagged" video file, the user will be able to quickly access the "tagged" event during the playback (e.g., by the user) of the "tagged" video file. More specifically, during the process of playback for the "tagged" video file, a video playback software application (e.g., POV Manager Interface, or otherwise) that may be employed in the POV video system, on an external device, or otherwise is utilized. In one aspect, the video playback application (e.g., program) may include a timeline bar 90 (FIG. 6) that represents the duration of the video file. Preferably, the timeline bar may include at least one locatable mark (e.g., depending on the number of "tagging" activations during recording of the "tagged" video), which generally corresponds to a time frame in which the user activated the "tagging" activator during the recording of the "tagged" video. It is appreciated, that the reference to "tagging," "tag," or otherwise is utilized herein for the purpose of identifying one or more functions of the present invention upon activation thereof. Accordingly, it is further appreciated that the one or more functions discussed herein that correspond to the "tagging," "tag," or otherwise identifier may include a similar or different identifier in other embodiments. Preferably the data file created by the activation of the "tagging" activator is free of a watermark, a hash-mark, or both "Tagging" may occur in several instances throughout the "Clip Mode" recording process. Once the recording module is connected (e.g., wired or wireless) to an external media device (e.g., computer, portable media player, the like, or otherwise) or the video may be removed from the POV video system by way of removable storage (e.g., SD memory card) and transferred to a removable storage drive of the external media device. Thereafter, the video may be edited using the software 100 (FIG. 5) included with the POV video system, discussed herein, or by other editing software known in the industry. Once the video is loaded by the software (e.g., POV Manager Interface 102), the video is displayed on timeline bar 90 (FIG. 6). The timeline bar includes highlighted markings which represent the "tagged" points in the video. The user can move the timeline bar cursor to a "tagged" point and the video playback software application will display that particular instance in the video from that point on until the playback is stopped. The user can continue to move the timeline bar cursor back and forth to each "tagged" point and begin playback at that point if so desired.

Another recording option includes a "Loop Mode," which allows the user to continuously record video, but will only store "tagged" intervals of video at a predefined length of time. Once the "Loop Mode" is selected, the user may designate a record time interval. This record time interval signifies how much time of the previously recorded video will be stored once the "TAG" activator on the user activator (e.g., recording module or remote control) is activated. For example, if the user has selected a record time interval of five minutes and has been recording video for the past twenty minutes when the "TAG" activator is activated, the last five minutes of the previously recorded twenty minutes will be stored on the recorder unit, the five minutes immediately following the "TAG," or both. Preferably, once the "TAG" activator is activated, both the previous record time interval and the following record time interval of recorded video will be stored on the storage medium. In the "Loop Mode," the recording module uses a looping process, which records video over previously recorded video that was not "tagged" and, therefore, not stored on the recorder unit. The recorder unit will continue to record video until the storage medium is filled with "tagged" recorded intervals.

By way of example, one method of recording video in "Clip Mode" includes the steps of activating an activator such as depressing the RECORD button on the recording module or the REC/TAG button on the wireless remote control to begin recording. During recording, the user may "tag" important points in the video to make them easier to locate (e.g., access) when viewing or editing the video with a video editing software (e.g., POV Manager Software, the like, or otherwise). To place a "tag" in the video the user activates the TAG soft key (e.g., SOFT KEY 2) on the recording module or the REC/TAG activator on the wireless remote control. To stop recording the user activates the RECORD activator on the recording module or the STOP activator on the remote control.

By way of example, one method of recording video in "Loop Mode" is as follows: to record in "Loop Mode" the user selects a record time interval by accessing the SETTING soft key and setting a record time interval, which allows the user to save a video segment of a pre-defined duration (e.g., time length of video). Recording video for the pre-defined duration in "Loop Mode" includes the steps of activating an activator such as depressing the TAG soft key on the recording module or the REC/TAG button on the remote control. The "Loop Mode" simplifies recording by allowing the user to leave the POV video system in recording mode all day (e.g. continuous recording), selectively storing preferred recorded video, while automatically deleting "untagged" recorded video, thereby efficiently utilizing space in the storage medium (e.g., "untagged" recorded video is temporarily stored on the storage medium until the "untagged" recorded video is replaced by the stored "tagged" portions of recorded video).

In "Loop" record mode the POV video system may record a continuous loop of video clips that may be all of the same duration (e.g., a period of less than one minute, a period of greater than about one minute, a period greater than about one hour). For example, if the record time interval of the POV video device is set to record 3 minute loops, it will record a series of 3 minute loops for as long as the unit is in Loop record mode. Then, when something happens that the user wants to save, the user activates the TAG activator on the recording module or REC/TAG activator on the remote control to save that loop.

Optionally or as an alternative, it is appreciated that in the "Loop Mode" the POV video device will also store more than one loop if the user "tags" a loop near the beginning or end of a loop. By way of one specific example: 1) If the user activates the TAG soft key on the recording module or the REC/TAG activator on the remote control during the first third of a loop, the previous loop and the current loop will be saved; 2) If the user activates the TAG soft key or the REC/TAG activator during the middle third of a loop, only the current loop will be saved; 3) If the user activates the TAG soft key or the REC/TAG activator during the last third of a loop, the following loop and the current loop will be saved. More specifically, for example, if the POV video system set to record 3 minute loops and the user activates TAG or REC/TAG during the first minute of the loop, the previous 3 minute loop will be saved in addition to the current loop for a total of six minutes of video. Similarly, if the user activates TAG or REC/TAG during the last minute of the loop both the current loop and the next loop will be saved. If the user does not "tag" anything the old loops may be discarded to make room for new video loops.

It is further appreciated that in one embodiment, the default mode for the POV video system is a mode referred to as a "Clip Mode," during which the user may continuously record and store video until the storage medium is full or until the user stops recording. To switch from "Clip Mode" to "Loop Mode: 1) The user activates the SETTINGS activator on the recording module and then activates the NEXT soft key (e.g., SOFT KEY 3) until Record Mode appears in the display. 2) The user activates the SELECT soft key and then the NEXT soft key until "Loop" appears in the display. 3) The user then activates the SELECT soft key (e.g., SOFT KEY 2) to choose "Loop mode."

It is further appreciated that in one embodiment, the POV video system may include a mode referred to as a "Loop Mode," during which the user may record a continuous loop of video clips that may be all of the same duration. Once in the "Loop Mode," the user will need to select the duration for each Loop that will be saved (e.g., record time interval). 1) The user activates the NEXT soft key until Loop Record Time appears in the display and then the user will activate the SELECT soft key. 2) The user activates the NEXT soft key repeatedly until the length of time desired appears. The user will select from a desired period of time such as one or more of: 20 seconds, 30 seconds, 1 minute, 2 minutes, 3 minutes, 5 minutes, 10 minutes, 15 minutes, or 30 minutes. 3) Once the desired value is shown in the display, the user activates the SELECT soft key to choose that duration.

Thereafter, the user may activate the RECORD activator on the recording module to place it in Standby mode. To begin recording in Loop mode the user activates the RECORD activator on the recording module or the REC/TAG activator on the wireless remote control. When the user wants to store a video segment, the user may activate the TAG soft key on the recording module or the REC/TAG activator on the remote control. To record another video segment the user activates the TAG soft key or the REC/TAG activator again. The process may be repeated until the storage medium is full or the user has stopped the recording.

The present invention may further comprise a software package configured for one or more of the following features: organizing videos, editing videos, sharing videos, storing local videos, remotely storing videos, the like or otherwise, and any combination thereof. In one embodiment, the software package may be provided on removable storage media such as a CD, DVD, flash drive, media card, the like or otherwise to be installed on an external media device. The software package 100 (FIG. 5) may include "Manager Interface Software" 102 (FIG. 6) that allows the user to create videos by combining one or more clips for the POV video system from various video segments as discussed in Provisional Application Ser. No. 60/879,854, filed Jan. 10, 2007, which is herein incorporated by reference for all purposes. Optionally or as an alternative, the software package may be configured to include "Editing Software" that allows the user to manipulate the video sections as discussed in Provisional Application Ser. No. 60/879,854, filed Jan. 10, 2007, which is herein incorporated by reference for all purposes.

When installed and accessed on a primary external media device such as a computer, the software package 100 may include a video editing program, a video playback program, the like or otherwise, and any combination thereof (e.g., POV Manger Interface) that enables the user to create a user profile having a user name and password, though not required. In one aspect, the POV Manager Interface may provide security provisions (e.g., user name and password authenticity), once the primary external media device is in signal communication with a secondary external media device. In another aspect, the POV Manager Interface may include one or more viewing panes on the display of the primary external media device. For example, there may be three main viewing panes, the "List" pane 80, "View" pane 82, and the "Storyboard" pane 84.

The List pane 80 may display a collection of videos from the storage medium of the POV video system 86 and the POV Library 88 (e.g., one or more videos stored on the primary external media device, the internet (e.g., one or more secondary external media devices in signal communication with the primary external media device or the POV video system, the like or otherwise, and any combination thereof). The user can use videos from either collection of videos (e.g., List Pane or POV Library) to view, create, and customize a new video clip using the View pane. The View pane may be the area in which the user will be able to play existing videos and extract content from selected videos to create new videos. The View pane may include a Timeline Indicator (e.g., timeline bar) 90 (FIG. 6) that displays the one or more "tagged" events 92 (e.g., locatable marks), the Video Extraction Handles that allow you to set the extractable video area, or both. The Storyboard pane may be the viewing pane that allows the user to create custom videos using clips extracted from other videos. In another aspect, video clips can be moved, copied, or deleted from one pane to other. The videos can be played by dragging clips from the List pane to the View pane, or by double clicking a clip in the List pane to be viewed in the View pane. In another aspect, the user may edit videos, by extracting clips from other videos, which can be saved to the user's video collection.

In another example, the POV Manager Interface allows the user to share videos with others. For example, one method for sharing videos may include the steps of installing software onto a primary external device; accessing the installed software; signaling a secondary external device; authenticating a user's access to the secondary external device to override a security feature; selecting one or more videos having a data signal from a storage medium; identifying an address of a recipient; and uploading the data signal to the identified address for sharing thereof. In more particular detail, the user may select one or more videos to be shared in the List pane. The user selects the SHARE activator and a Share Screen dialog is displayed (optionally, the user may have to Sign In to the POV Manager Interface for user authenticity as discussed herein). The user identifies the address (e.g., email address) and enters the address information for one or more recipients, optionally a Title (e.g., Subject), a Message, or both, and then the user selects SEND. The POV Manager Interface will display an "Upload Status" dialog showing the progress of the video while uploading, as the video is being sent to the one or more recipients. The upload of the video and the sending of the email message can be canceled prior to completion of the upload.

It is further appreciated that the present invention may include one or more of the following features such as continuous loop recording, automatic deletion of recorded content without tags, repeatable "tagging" of multiple events, use of a Meta file for "tagging" data (e.g., external file for "tagging" data), head mounted camera connection with integrated head identification and system configuration (i.e., may work with multiple head units, could come up with an IR sensitive head), submersible wearable camera system (i.e. for head, body, or both), detachable camera head systems, wireless remote for wearable video camera systems with "tagging" functionality, GPS and time stamping embedded functionality, integration of 6-axis inertial sensors (e.g., electronic compass—overlay that on the display screen), overlay of GPS and 6-Axis inertial data into recorded video, low-light operation, evidentiary control features (e.g., GSA and FAR compliant models), a medical monitor (.e.g., heart rate monitor), the like or otherwise, and any combination thereof. It is contemplated that the POV video system may include GPS such that the location of the POV video system can be displayed on a map overlay within the display of the POV video system, the display of an external device, or otherwise, and any combination thereof. It is further contemplated that the recording device may be configured for recording video while tracking and storing the movement of the POV video system in real-time GPS and then displaying the movement on a map overlay in real-time or for retrieval and display at a later time. It is yet further contemplated that the POV video system may be configured for activating a "tagging" activator to create one or more locatable marks within the map overall, for determining speed, distance, elevation, the like or otherwise, and any combination thereof with respect to changes in movement, position, or otherwise and any combination thereof of the POV video system.

Examples of technical specifications for one specific embodiment of the present invention include, but are not limited to Table 2 are as follows. Variations of these parameters (e.g., within about (+/−) 25%) are also contemplated.

TABLE 2

| CAMERA | |
|---|---|
| Resolution | 720 × 480 Pixels |
| Camera Chip | Advanced CMOS |
| H × V (pixels) | NTSC: 720 × 480 |
| Field of View | 68 degrees |
| Outer Casing | Matte Black |
| Light Sensitivity | 5.0 LUX for Color |
| | 0.1 LUX for Black and White |
| Weight | 58 g |
| Dimensions | 24 mm (Ø) × 75 mm (L) |
| MICROPHONE | |
| Microphone Type | Monaural omni-directional cable mounted ~40 dB sensitivity at 1 kHz |
| Resolution | 16-bit half-duplex |
| Sampling Rate | 32 kHz |
| Signal Noise Reduction (SNR) | 80 dB |
| Speaker | Monaural 8 ohm Mylar, 0.7 W max |
| STORAGE MEDIUM | |
| RAM | 64 MB |
| Internal Memory | 16 MB NAND Flash |
| External Storage | Secure Digital (SD) Card |
| Internal Storage Priority | SD Card |
| DISPLAY | |
| Size | 2 inch |
| Type | LTPS Liquid Crystal Display (LCD) |
| Resolution | 640 × 240 dots (153k) |
| Color Arrangement | RGB Delta |
| Color Number | Full Color |
| Brightness | 360 cd/m$^2$ |
| Input/Output Ports | |
| Removable Media Drive (SD Card Slot) | |
| USB 2.0 High Speed (mini-b) | |
| External Microphone Input | |
| NTSC/PAL Analog, TV/Audio Output (also Live Stream Capable) | |

It will be further appreciated that functions or structures of a plurality of components or steps may be combined into a single component or step, or the functions or structures of one-step or component may be split among plural steps or components. The present invention contemplates all of these combinations. Unless stated otherwise, dimensions and geometries of the various structures depicted herein are not intended to be restrictive of the invention, and other dimensions or geometries are possible. Plural structural components or steps can be provided by a single integrated structure or step. Alternatively, a single integrated structure or step might be divided into separate plural components or steps. In addition, while a feature of the present invention may have been described in the context of only one of the illustrated embodiments, such feature may be combined with one or more other features of other embodiments, for any given application. It will also be appreciated from the above that the fabrication of the unique structures herein and the operation thereof also constitute methods in accordance with the present invention. The present invention also encompasses intermediate and end products resulting from the practice of the methods herein. The use of "comprising" or "including" also contemplates embodiments that "consist essentially of" or "consist of" the recited feature.

The relative positions, the geometries, the dimensional properties, or any combination thereof, of the depicted embodiments and the subcombinations featured therein are also part of the invention herein, even if not verbally described. Switch or command names employed herein are not intended as limiting, but also contemplate other names that perform similar functions (e.g., a "SEND" command also contemplates other options for eliciting a response concerning transmission of information; "TAG" or "REC/TAG" also contemplate other options for eliciting a response concerning the performance of the function associated with the "TAG" or "REC/TAG" features described herein). The explanations and illustrations presented herein are intended to acquaint others skilled in the art with the invention, its principles, and its practical application. Those skilled in the art may adapt and apply the invention in its numerous forms, as may be best suited to the requirements of a particular use. Accordingly, the specific embodiments of the present invention as set forth are not intended as being exhaustive or limiting of the invention. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes.

The invention claimed is:

1. A point of view video system comprising:
   a. a camera for receiving an image and for generating a video signal;
   b. a portable video image recording module including:
      i) a display;
      ii) one or more user activators;
      iii) a communication interface for signally communicating with the camera that is remote from the recording module;
      iv) a power source;
      v) a speaker;
      vi) an electronic storage medium;
      vii) a processing device in signaling communication with the display, the one or more user activators, the speaker, and the communication interface for processing data and the electronic storage medium, wherein the one or more user activators include an activator for recording and a second user activator for stopping recording; and
   c. a sealed housing for containing the recording module, the sealed housing:
      i) being separate from the camera;
      ii) including a generally common forward surface with which the display device and the one or more user activator are generally coextensive, and a curved rearward surface; and
      iii) including a removable cover located at an end of the sealed housing that allows access to one or more I/O ports, a storage medium, the power source, or any combination thereof, wherein the removable cover includes a locking mechanism for attaching to the sealed housing;
   d. a remote control having a first user activator for recording a video, tagging a video, or both and a second user activator for stopping recording;
   e. a microphone, a light, or both; and
   f. a cable connecting the sealed housing with the camera; wherein the system stores video files or images in the form of data files on the electronic storage medium.

2. A method for selectively creating one or more locatable marks during playback of a recorded video comprising the steps of:
   providing an image recording module for recording a video;
   recording a video that includes a video signal, an audio signal, or both as a result of using a user activator;
   recording the video not as a single data file but as a series of clips of a pre-set length so that when a clip reaches the pre-set length, the clip is saved as a completed data file and recording in a new data file begins;
   activating a tagging activator at a time frame during recording step thereby retaining the current data file that includes a tag, and/or retaining one or more data files that are in close proximity to the tag with regard to time, wherein the one or more data files are recorded data files if the tag is at an beginning of a clip, or data files that will be recorded in the future if the tag is at an end of a clip
   automatically deleting data files that are not within close proximity of a tag;
   storing the current data file and/or the one or more data files on the electronic storage medium of the image recording module;
   accessing the recorded video using a video playback program that includes a video timeline bar configured for showing a representation of the video progress with respect to time;
   accessing the information included in the current data file and/or the one or more data files for playback of the recorded video;
wherein the video playback program creates at least one locatable mark in the video timeline bar that corresponds to the time frame of an activating step; and
wherein the at least one locatable mark is available for direct access to the recorded video that was recorded at the time frame of the activating step.

3. A method for selectively storing one or more intervals of recorded video comprising the steps of:
   providing a point of view video system according to claim 1;
   setting a record time interval, which defines a length of time of a recorded video that is retained or protected from automatic deletion upon activation of a tagging activator of the portable video image recording module;

automatically deleting one or more data files that have not been protected by the tagging activator, recording a series of videos that include a video signal, an audio signal, or both;

activating the tagging activator of the portable video image recording module during a recording step thereby retaining at least one tagged event with a pre-set length from the series of videos.

4. The method of claim 2, wherein at least one stored data file is retained and protected from automatic deletion because a tagged portion of a following data file has a tag that occurred near a beginning of the at least one stored data file, and/or wherein at least one stored data file is retained and protected from automatic deletion because a previous data file has a tag that occurred near an end of the at least one stored data file so that one or more data files that are close to a tag with respect to time may be retained even when the tagging activator was not activated during recording of the one or more data files.

5. The method of claim 4, wherein during the recording step, the video is continually recorded until the storage medium is full of one or more of the at least one stored tagged portion of the recorded video in the form of data files stored on the storage medium or the user stops the recording.

6. The method according to claim 5, wherein the data files comprise one or more files in a format selected from WMV, AVI, MPEG, MOV, WMA, MP3, MP4, WOV, or a combination thereof.

7. The system of claim 1, wherein the processing device comprises one or more separate processors, one or more integrated processors having several combined processors, or both, and
wherein the processing device controls one or more components of the point of view video system upon activation of the one or more user activators of the portable video image recording module, the remote control, or both.

8. The system of claim 7, wherein the one or more user activators of the recording module are located between the display and a speaker grille, the remote control is wireless such that the remote control is not tethered to the recording module, and the processing device is included on a main circuit board.

9. The method according to claim 3, including the step of accessing the at least one tagged event during playback of a recorded video through a video playback software in a portable video image recording module,
wherein the video playback software includes a video timeline bar, and
wherein the video timeline bar includes at least one locatable mark representing the at least one tagged event.

10. A method for saving important data from a recorded video comprising steps of:
recording a series of video clips by a portable video image recording module, each video clip having a pre-set length,
storing the series of video clips in an electronic storage medium in a portable video image recording module,
retaining at least one clip within the series of video clips by tagging important data within the series of video clips;
storing a tagged data on the portable video image recording module;
automatically deleting one or more video clips in the series of video clips without tags,
tagging of multiple video clips in the series of video clips, repeatedly tagging one or more video clips in the series of video clips, or a combination thereof;
setting a record time interval of each video in the series of video clips to be five minutes,
storing a series of five-minute-long video clips,
retaining a tagged video by activating a user activator of the portable video image recording module, of a remote control, or both after recording a video for more than five minutes, wherein the tagged video includes last five minutes of the previously stored series of video clips.

11. The method of claim 10 including a step of recording a video captured by a camera and recording audio captured by a microphone.

12. The method of claim 11, wherein the tagged data includes information describing a video clip within the series of video clips, the information comprising a tagged video identifier which identifies a corresponding video clip within the series of video clips, a time identifier that identifies a time interval between one or more known points in a video clip within the series of video clips, or both.

13. The method of claim 12, wherein the time interval is an interval between a start of the video clip within the series of clips to a tagging activation, between a first tagging activation and a second tagging activation, between a first or second tagging activation to an end of the video clip within the series of clips, or a combination thereof.

14. The system according to claim 10 including a step of storing more than one video clip in the portable video image recording module by activating a tagging activator near a beginning or near an end of the pre-set length of a video clip which is being recorded.

15. The method of claim 14 including steps of:
setting a length of each video clip in a series of video clips to be recorded, wherein the length can be divided in portions,
storing a current video clip and a previous video clip by activating a tagging activator of the portable video image recording module during a first portion of the current video clip, storing a current video clip only by activating a tagging activator during a second portion of the current video clip, or storing a current video clip and the following video clip by activating a tagging activator during a third portion of the current video clip.

16. The method of claim 14 including steps of:
setting a length of each video clip within the series of video clips to be recorded to 3 minutes,
storing a current video clip and a previous video clip by activating a tagging activator of the portable video image recording module during a first minute of the current video clip, storing a current video clip only by activating a tagging activator during a second minute of the current video clip, or storing a current video clip and the following video clip by activating a tagging activator during a third minute of the current video clip.

17. The method of claim 14, wherein a length of each video clip in a series of video clips is set to a period greater than about one hour.

18. The method of claim 10 further including steps of:
selecting continuous recording of video clips to be saved by pushing one or more user activators on the portable video image recording module,
retaining at least one separate data file by tagging important data within the series of video clips by activating one or more other user activators on a portable video image recording module,
managing the tagged data on a portable video image recording module by organizing one or more videos, editing the one or more videos, sharing the one or more videos, or a combination thereof.

19. The method of claim 10, wherein the tagged video also includes five minutes immediately following the last five minutes of the previously stored series of video clips.

20. A method of claim 10, wherein the portable video image recording module comprises:
  i) a display;
  ii) one or more user activators;
  iii) a communication interface for signally communicating with the camera that is remote from the recording module;
  iv) a power source;
  v) a speaker;
  vi) the electronic storage medium;
  vii) a processing device in signaling communication with the display, the one or more user activators, the speaker, and the communication interface for processing data and the electronic storage medium, wherein the one or more user activators include an activator for recording and a second user activator for stopping recording.

* * * * *